(12) United States Patent
Iwama et al.

(10) Patent No.: US 9,305,247 B2
(45) Date of Patent: *Apr. 5, 2016

(54) IMAGE FORMING DEVICE THAT PERFORMS MISREGISTRATION CORRECTION TO CORRECT POSITIONS OF COLOR IMAGES

(71) Applicant: BROTHER KOGYO KABUSHIKI KAISHA, Nagoya-shi, Aichi-ken (JP)

(72) Inventors: Noritaka Iwama, Nagoya (JP); Raizo Kosaka, Konan (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/627,526

(22) Filed: Feb. 20, 2015

(65) Prior Publication Data

US 2015/0242731 A1    Aug. 27, 2015

(30) Foreign Application Priority Data

Feb. 27, 2014    (JP) .................................. 2014-036803

(51) Int. Cl.
*H04N 1/58* (2006.01)
*G06K 15/02* (2006.01)
*H04N 1/00* (2006.01)
(Continued)

(52) U.S. Cl.
CPC ............. *G06K 15/027* (2013.01); *B41J 29/393* (2013.01); *G03G 15/00* (2013.01); *G06K 15/129* (2013.01); *G06K 15/1878* (2013.01); *H04N 1/00015* (2013.01); *H04N 1/00023* (2013.01); *H04N 1/00031* (2013.01); *H04N 1/00045* (2013.01); *H04N 1/00082* (2013.01);
(Continued)

(58) Field of Classification Search
None
See application file for complete search history.

(56) References Cited

U.S. PATENT DOCUMENTS 8,009,320 B2 *  8/2011  Bae ................................ 358/504
9,037,011 B2 *  5/2015  Tsuruya ........................ 399/301
(Continued)

FOREIGN PATENT DOCUMENTS

JP    2000-158707 A    6/2000
JP    2003-108335 A    4/2003
(Continued)

OTHER PUBLICATIONS

Related U.S. Appl. No. 14/627,246, filed Feb. 20, 2015.
(Continued)

*Primary Examiner* — Scott A Rogers
(74) *Attorney, Agent, or Firm* — Merchant & Gould P.C.

(57) ABSTRACT

In an image forming device, a processor acquires a reference value set for the color combination of two different colors; determines whether the reference value meets an execution condition for correcting misregistration between the two different colors in two image pieces to be superposed one on the other, the determination being performed before forming a finished image including at least a color image portion formed by superposing one of the color image pieces on at least one of remaining color image pieces by using a plurality of image-forming units; forms registration marks for the two different colors in response to determination that the reference value meets the execution condition; and adjusts image-forming positions corresponding to the two different colors subject to correction of misregistration based on outputs of an light-receiving element providing detection results of the position of each of the registration marks.

21 Claims, 6 Drawing Sheets

(51) Int. Cl.
*H04N 1/60* (2006.01)
*H04N 1/23* (2006.01)
*B41J 29/393* (2006.01)
*G03G 15/00* (2006.01)
*G06K 15/12* (2006.01)

(52) U.S. Cl.
CPC ............. *H04N 1/2315* (2013.01); *H04N 1/58* (2013.01); *H04N 1/6033* (2013.01)

(56) References Cited

U.S. PATENT DOCUMENTS

2007/0242965 A1* 10/2007 Akamatsu ..................... 399/49
2008/0170277 A1* 7/2008 Bae ............................. 358/504
2009/0213399 A1 8/2009 Ikeda
2009/0244561 A1 10/2009 Mongeon
2011/0182602 A1 7/2011 Suzuki

FOREIGN PATENT DOCUMENTS

| | | |
|---|---|---|
| JP | 2005-181534 A | 7/2005 |
| JP | 2011-110825 A | 6/2011 |
| JP | 2011-154270 A | 8/2011 |
| JP | 2013-125108 A | 6/2013 |

OTHER PUBLICATIONS

Notice of Allowance issued in related U.S. Appl. No. 14/627,246, mailed Aug. 5, 2015.
Notice of Allowance issued in related U.S. Appl. No. 114/627,246, mailed Aug. 5, 2015.

* cited by examiner

| COLOR COMBINATION | ESTIMATED OFFSET | THRESHOLD VALUE |
|---|---|---|
| Y-M | 14 | 100 |
| M-C | 88 | 90 |
| C-Y | 102 | 100 |
| K-Y | 42 | 100 |
| K-M | 28 | 100 |
| K-C | 60 | 100 |

IMAGE FORMING DEVICE THAT PERFORMS MISREGISTRATION CORRECTION TO CORRECT POSITIONS OF COLOR IMAGES

CROSS REFERENCE TO RELATED APPLICATION

This application claims priority from Japanese Patent Application No. 2014-036803 filed Feb. 27, 2014. The entire content of the priority application is incorporated herein by reference.

TECHNICAL FIELD

The present invention relates to an image forming device that forms color images by superposing a plurality of images and a method and program of correcting misregistration of the plurality of images, and particularly to a technique of misregistration correction for adjusting color registration.

BACKGROUND

Image forming devices that form color images by superposing images in a plurality of colors formed respectively by a plurality of process units have conventionally performed misregistration correction to adjust color registration. An example of misregistration correction is a process of forming a registration mark in each color, acquiring the amount of offset between the mark of a reference color and the mark of an adjustment color, and adjusting the position of the adjustment color based on a correction value corresponding to the amount of offset.

Various documents have been published on adjusting images, such as the misregistration correction described above. One image forming device known in the art employs a method of counting the total number of sheets discharged from the device over time and of forming registration marks for adjusting registration when the total number of discharged sheets reaches a prescribed number pre-stored on the device (see Japanese Patent Application Publication No. 2013-125108).

SUMMARY

However, the conventional technology described above does not consider the combinations of colors used in printing as part of the condition for forming registration marks. That is, some color combinations are not used often depending on the image. Therefore, it is not preferable to increase the frequency of forming parks for combinations not used frequently.

In view of the foregoing, it is an object of the present invention to provide an image forming device that performs misregistration correction to correct the positions of color images printed out of register. It is another object of the present invention to provide a technique for forming registration marks for correcting misregistration based on the content of the image to be printed.

In order to attain the above and other objects, the present invention provides an image forming device that may include a plurality of image-forming units; a light-emitting element; a light-receiving element; a memory; and a processor. The plurality of image-forming units may be configured to form color image pieces different in color. The light-emitting element may be configured to emit light. The light-receiving element may be configured to receive light. The memory may be configured to store an execution condition for each color combination of two different colors, the execution condition being for correcting misregistration between the two different colors in two image pieces to be superposed one on the other. The processor may be configured to: acquire a reference value set for the color combination of two different colors; read the execution condition from the memory; determine whether the reference value meets the execution condition, the determination being performed before forming a finished image including at least a color image portion formed by superposing one of the color image pieces on at least one of remaining color image pieces by using the plurality of image-forming units; form registration marks for the two different colors in response to determination that the reference value meets the execution condition; emit light toward a position of each of the registration marks by the light-emitting element; receive reflected light from the registration marks by the light-receiving element; and adjust image-forming positions corresponding to the two different colors subject to correction of misregistration based on outputs of the light-receiving element providing detection results of the position of each of the registration marks.

BRIEF DESCRIPTION OF THE DRAWINGS

The particular features and advantages of the invention as well as other objects will become apparent from the following description taken in connection with the accompanying drawings, in which.

DETAILED DESCRIPTION

An image forming device according to a preferred embodiment of the present invention will be described while referring to the accompanying drawings wherein like parts and components are designated by the same reference numerals to avoid duplicating description. In the preferred embodiment, the present invention is applied to a multifunction peripheral (MFP) 100 provided with a color-image-forming function.

Figure 1:
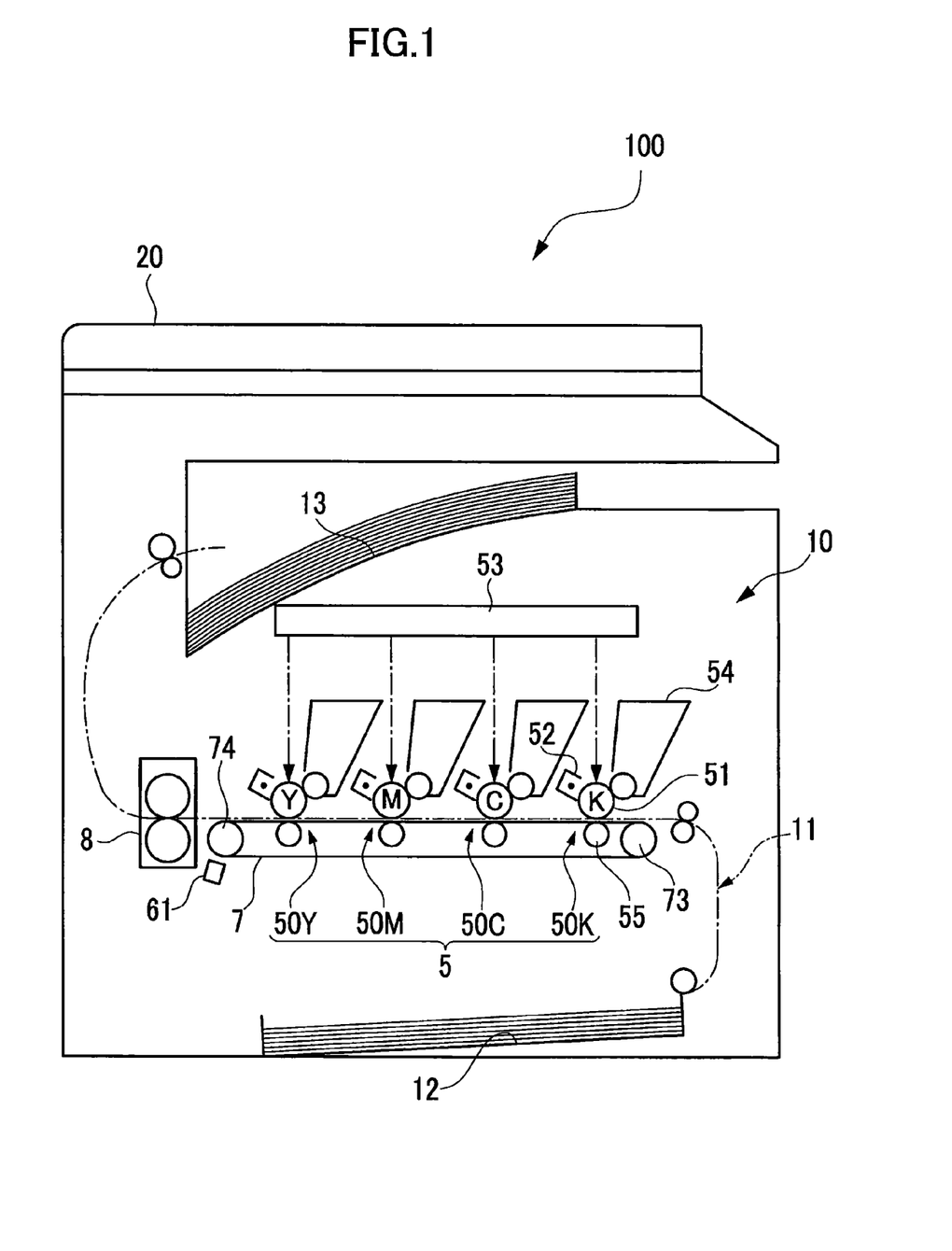
FIG. 1 is a cross-sectional view illustrating a schematic configuration of a multifunction peripheral (MFP) according to an embodiment of the present invention.

As shown in FIG. 1, the MFP 100 of the preferred embodiment includes an image-forming unit 10, and an original-reading unit 20. The image-forming unit 10 forms images on sheets, while the original-reading unit 20 reads images from originals. The original-reading unit 20 has an image sensor, and reads an image from an original while the original is moved relative to the image sensor. The method of moving the original relative to the image sensor may be a method of leaving the original stationary while moving the image sensor, or leaving the image sensor stationary while moving the original. Further, the reading system may be configured of a contact image sensor (CIS) or a charge-coupled device (CCD). Further, the original-reading unit 20 may have the capacity to read color images or may only be able to read in black and white.

The image-forming unit 10 has a process unit 5, a conveying belt 7, and a fixing unit 8. The process unit 5 forms toner images on a sheet through an electrophotographic method. The conveying belt 7 conveys sheets to a position confronting the process unit 5. The fixing unit 8 fixes the toner images transferred by the process unit 5 to the sheet. The process unit 5 includes a similar configuration for each of the colors yellow, magenta, cyan, and black. These configurations are juxtaposed along one side (the top in FIG. 1) of the conveying belt 7.

More specifically, the structures of the process unit 5 for the colors include a yellow unit 50Y, a magenta unit 50M, a cyan unit 50C, and a black unit 50K. FIG. 1 shows one arrangement and order for the color units 50 of the process unit 5, but the order of the color units 50 is not limited to the example in FIG. 1.

Each color unit 50 in the process unit 5 has a photosensitive body 51, a charging unit 52, a developing unit 54, and a transfer unit 55. The process unit 5 also includes an exposure unit 53 disposed above the color units 50 and used for all colors. Thus, the exposure unit 53 is also considered a component of the process unit 5. When the MFP 100 performs image formation, each charging unit 52 applies a charge to the surface of the corresponding photosensitive body 51, and the exposure unit 53 subsequently exposes the surface, whereby an electrostatic latent image is formed on the surface of the photosensitive body 51 based on print data. The developing unit 54 supplies toner to the electrostatic latent image formed on the surface of the corresponding photosensitive body 51 to form a toner image.

The conveying belt 7 is an endless belt that is looped around belt rollers 73 and 74. The conveying belt 7 circulates counterclockwise in FIG. 1 by the rotation of the belt rollers 73 and 74. Thus, the conveying belt 7 conveys a sheet on its outer surface in a direction from the process unit 5 toward the fixing unit 8.

The MFP 100 also includes a sheet-conveying path 11, a paper tray 12, and a discharge tray 13. The paper tray 12 accommodates sheets to be printed, while the discharge tray receives sheets discharged after being printed. When printing on a sheet, the MFP 100 conveys the sheet to be printed from the paper tray 12 to the conveying belt 7 along the sheet-conveying path 11. The MFP 100 transfers toner images formed on the photosensitive bodies 51 to the sheet conveyed on the conveying belt 7.

The MFP 100 forms a color image on a sheet with toner by transferring the toner image formed on the photosensitive body 51 for each color by the color unit 50 of the corresponding color so that all toner images are superposed onto the same sheet. The toner image transferred onto the sheet is subsequently fixed to the sheet in the fixing unit 8. After the image has been fixed to the sheet, the sheet is discharged into the discharge tray 13.

Figure 2:
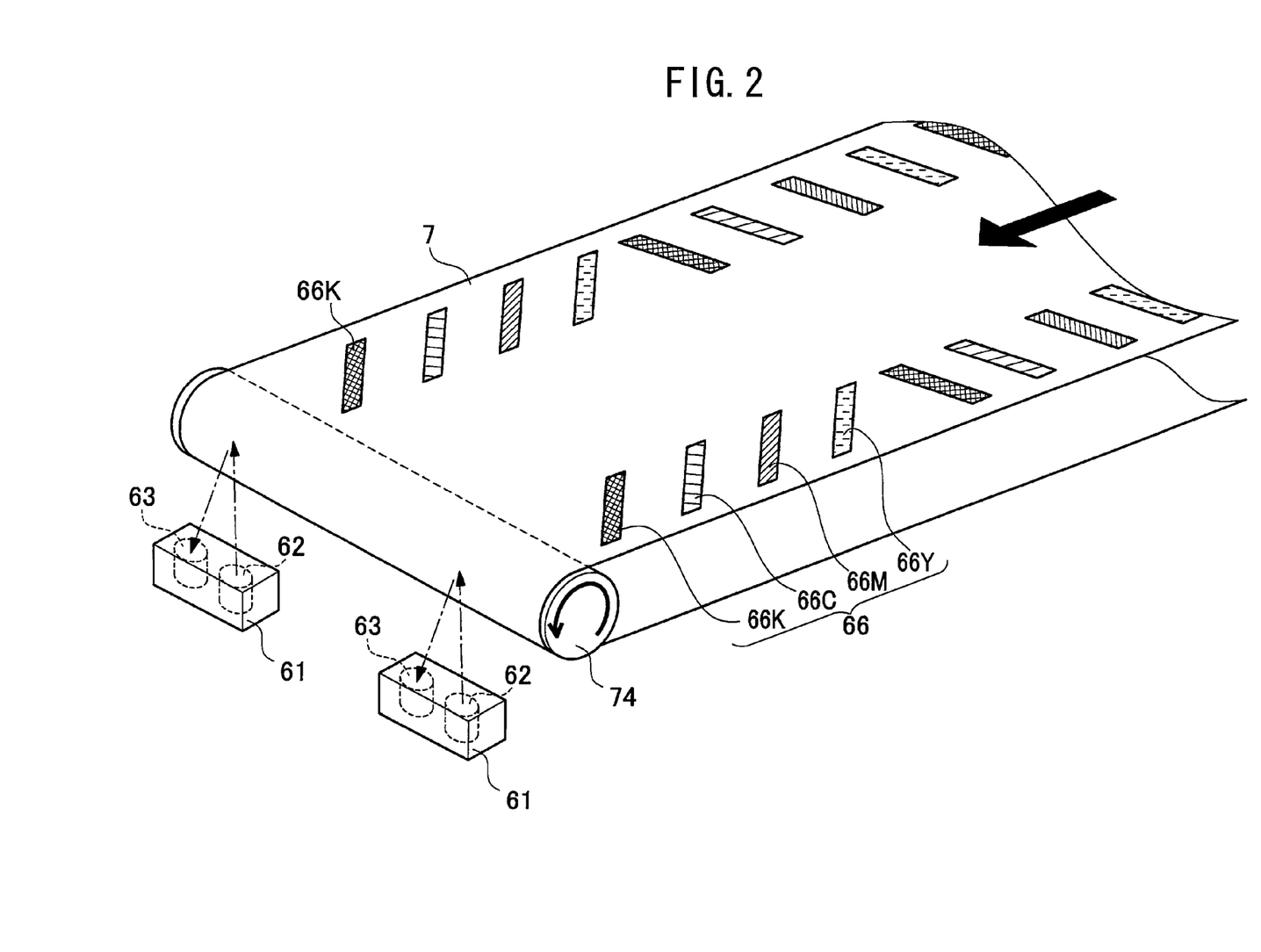
FIG. 2 is an explanatory diagram showing examples of registration marks and marker sensors.

When forming color images on the MFP 100 of the preferred embodiment, it is desirable to minimize offset in the overlapping positions of toner images formed by the color units 50. Therefore, before performing image formation, the MFP 100 executes a misregistration correction process for minimizing positional offset among color images when a condition for executing the misregistration correction process has been met. In the misregistration correction process, the MFP 100 controls the color units 50 to form registration marks 66 on the conveying belt 7 and detects the positions of the registration marks 66 formed in each color, as illustrated in the example of FIG. 2. Based on the detection results, the MFP 100 calculates correction values for adjusting the positions at which the images are formed. The misregistration correction process will be described later in greater detail.

In order to perform the above process, the MFP 100 includes marker sensors 61 for detecting toner images on the conveying belt 7. In the example shown in FIG. 2, the marker sensors 61 are reflection-type optical sensors, each of which has a light-emitting element 62 and a light-receiving element 63. The light-emitting element 62 of each marker sensor 61 emits light toward the conveying belt 7, and the light-receiving element 63 receives light reflected off the conveying belt 7. The MFP 100 can detect a toner image formed on the conveying belt 7 based on a signal outputted from the marker sensor 61 in response to the intensity of light received by the light-receiving element 63. The marker sensors 61 are examples of the sensors in the present invention.

The registration marks 66 are formed in each color provided in the process unit 5 and are positioned so as not to overlap each other. As shown in the example of FIG. 2, the registration marks 66 include marks 66Y, 66M, 66C, and 66K formed in their respective colors by the corresponding color units 50 so as to be arranged along the moving direction of the conveying belt 7. Note that the shape and arrangement order of the marks are not limited to the example in FIG. 2. The color units 50 of the process unit 5 for each color are an example of the plurality of image-forming units in the present invention.

Figure 3:
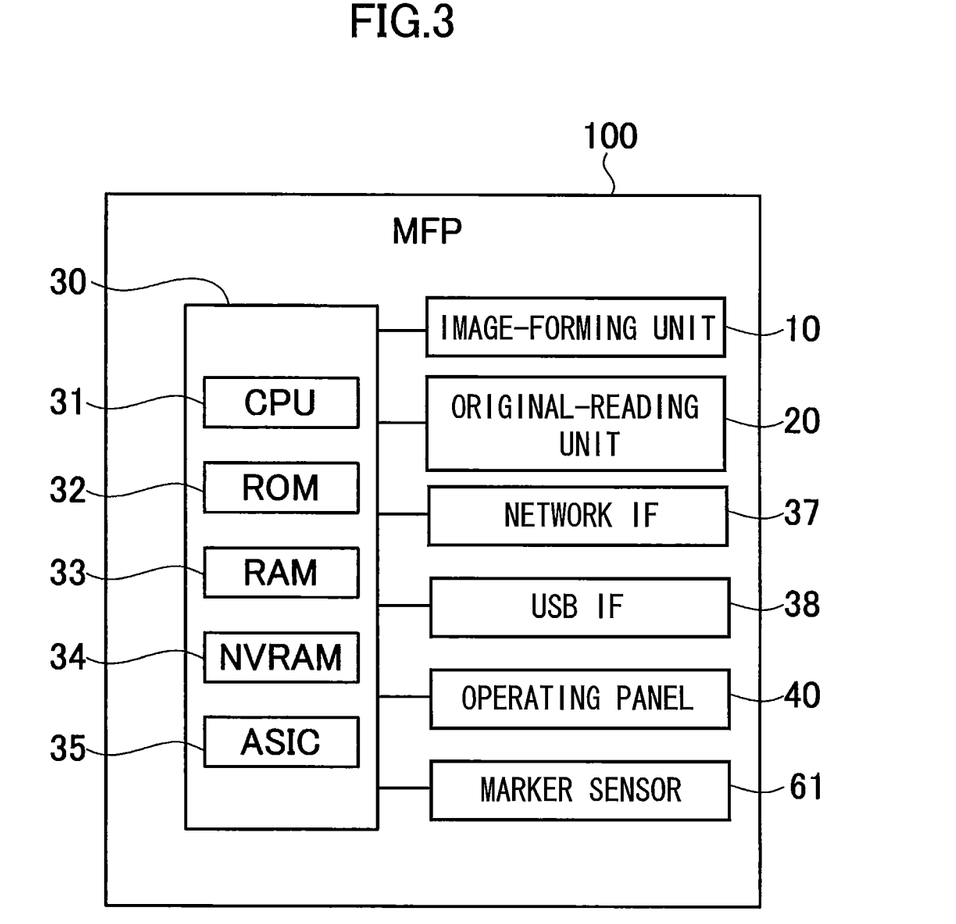
FIG. 3 is a block diagram showing an electrical configuration of the MFP.

Next, the electrical configuration of the MFP 100 will be described. As shown in FIG. 3, the MFP 100 includes a controller 30 that possesses a CPU 31, a ROM 32, a RAM 33, a NVRAM (nonvolatile RAM) 34, and an ASIC 35. The MFP 100 also includes the image-forming unit 10, original-reading unit 20, and marker sensors 61 described above, and a network interface 37, a USB interface 38, and an operating panel 40, all of which components are electrically connected to the controller 30.

The ROM 32 stores various control programs for controlling the MFP 100, various settings, initial values, and the like. The ROM 32 is an example of the storage medium in the present invention. The RAM 33 is employed as a work area into which the control programs are read, or a storage area for temporarily storing data. The CPU 31 controls the various components of the MFP 100 according to the control programs read from the ROM 32 while storing process results in the RAM 33 or NVRAM 34.

The CPU 31 is an example of the processor in the present invention. However, the controller 30 or the ASIC 35 may be considered the processor. Note that the controller 30 in FIG. 3 having the CPU 31 and the like collectively denotes all hardware used to control the MFP 100 and is not limited to a single piece of hardware in the MFP 100.

The network interface 37 is hardware for executing communications with devices connected to the MFP 100 via a network using a LAN cable or the like. The USB interface 38 is hardware for executing communications with devices connected to the MFP 100 via a USB cable or the like. The operating panel 40 displays information for the user and accepts instructions inputted by the user.

Next, the misregistration correction process performed on the MFP 100 of the preferred embodiment will be described. Misregistration is deviation between an ideal position of a toner image and the actual position when the toner image is formed. Types of misregistration to be corrected may include deviation from an ideal position in either the main scanning direction or sub scanning direction, and relative offset among colors. While the MFP 100 of the preferred embodiment performs various processes to correct misregistration, the misregistration correction process in this specification will target offset among colors.

In the misregistration correction process, the MFP 100 of the preferred embodiment corrects positional deviation among colors by adjusting the relative positions of toner images formed in each of the plurality of colors. For example, one color of the superposed images is set as a reference color, and the position of a toner image in another color is corrected to match the position of the toner image in the reference color.

In the misregistration correction process, first the MFP 100 acquires the current amount of positional offset for each color, and calculates correction values for correcting color misregistration based on the acquired positional offsets. The MFP 100 further stores the calculated correction values in the NVRAM 34. During image formation, the MFP 100 corrects the positions of each color image based on the correction values stored in the NVRAM 34 to form an image with minimal misregistration.

Thus, the misregistration correction process can be divided into an offset acquisition process for acquiring the current amounts of positional deviation; a correction value calculation process for calculating a correction value for each color needed to correct the positions of images in that color based on the offsets acquired in the offset acquisition process; and a position adjustment process for adjusting image-forming positions of images using the correction values calculated in the correction value calculation process. Since the position adjustment process in the misregistration correction process executed by the MFP 100 is a well-known procedure, a detailed description of this process will not be provided herein.

In the offset acquisition process, the MFP 100 acquires the current amount of deviation for each pair of colors. To achieve this, first the MFP 100 forms registration marks 66 for colors targeted for correction. More specifically, the process unit 5 forms toner images of the registration marks 66 while a sheet is not being conveyed on the conveying belt 7 so that the registration marks 66 are transferred onto the conveying belt 7. Subsequently, the MFP 100 detects the positions of registration marks 66 for each color on the conveying belt 7 based on signals outputted from the marker sensors 61.

The registration marks 66 shown in FIG. 2 are strip-like toner images angled in a direction that slopes relative to the moving direction of the conveying belt 7 and include a plurality of marks spaced at intervals in the moving direction of the conveying belt 7. However, the shape and arrangement of the registration marks 66 is not limited to this example. For example, the registration marks 66 may be strip-like marks arranged orthogonal to the moving direction of the conveying belt 7, or may be a combination of slanted strips and orthogonal strips. By using such a combination, it is possible to acquire positional offsets in both the main scanning direction and sub scanning direction. Note that the registration marks 66 are arranged in the direction orthogonal to the moving direction of the conveying belt 7 in positions at which the marker sensors 61 can detect them.

In the offset acquisition process, the MFP 100 acquires positional offset between marks of all colors included in the combination of colors targeted for correction based on the positions of individual registration marks 66 acquired as described above. For example, when acquiring offset between magenta and cyan marks, the MFP 100 acquires the distance between the detected position of the magenta mark 66M and the detected position of the cyan mark 66C, quantifies the difference between this acquired distance and the ideal distance while adding a positive or negative sign depending on the direction of offset, and sets the result as the positional offset. Further, the MFP 100 forms a plurality of registration marks 66, acquires positional offset a plurality of times, and sets the positional offset between magenta and cyan to the average value.

However, even after acquiring the current amounts of positional offset through the offset acquisition process described above, these amounts may change while executing a continuous print, for example. Therefore, it is possible that the amounts of offset at the beginning of an image-forming operation will differ from the amounts of offset at the time the correction values stored in the NVRAM 34 were calculated. In other words, correction values used in image formation will be based on more current offsets if the offset acquisition process and correction value calculation process are executed frequently, improving the probability of forming images with little misregistration. On the other hand, executing the offset acquisition process more frequently leads to an increase in the amount of toner expending for forming the registration marks 66 and the number of rotations of the photosensitive bodies 51, for example. This may impact the service life of the MFP 100 as a result.

Therefore, when a command to form a color image is received, the MFP 100 of the preferred embodiment determines whether it is necessary to execute the offset acquisition process prior to executing the image-forming operation. When forming a monochrome image, for example, there is little need to execute the offset acquisition process since color misregistration will not occur, even if the correction values stored in the NVRAM 34 do not accurately reflect the current offsets. Further, if the offset acquisition process was just executed, there is little need to execute the process again. In other words, the MFP 100 of the embodiment determines the necessity of executing the offset acquisition process based on the content of the image to be printed and the like.

Figure 4:
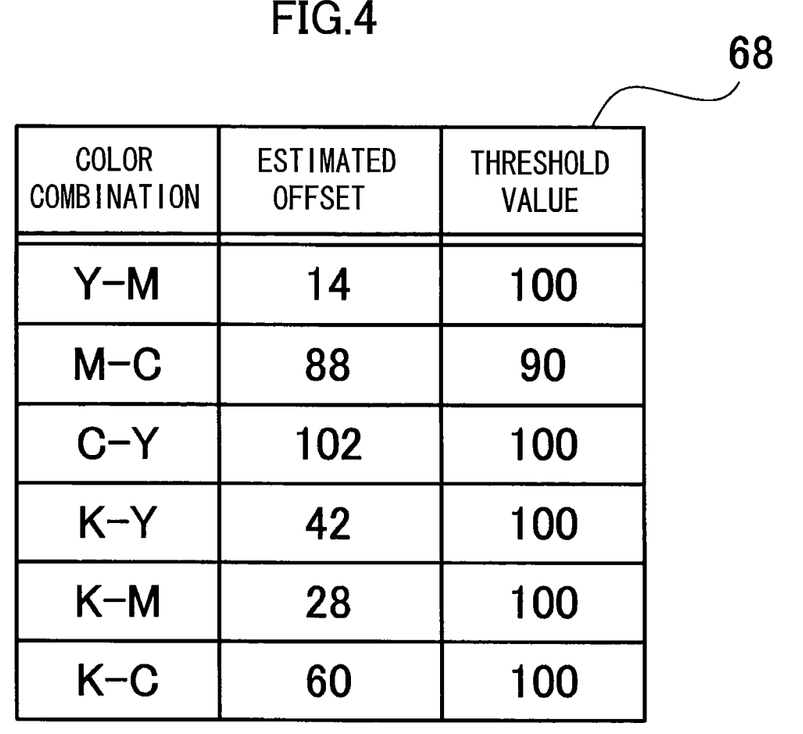
FIG. 4 is an explanatory diagram showing a look-up table.

A look-up table 68, such as that shown in FIG. 4, is stored in the NVRAM 34 to aid in determining the necessity of executing the offset acquisition process. The look-up table 68 stores an estimated offset and a threshold value for each combination of two colors. The MFP 100 uses the estimated offsets and threshold values stored in the NVRAM 34 to determine the necessity of executing the offset acquisition process.

Estimated offsets stored in the look-up table 68 are values found by estimating the degree of difference that has occurred between the positional offset acquired in the previous offset acquisition process and the current positional offset for each color combination and by quantifying these values. Positional offsets are initialized after executing the offset acquisition process. When the occurrence of offset is subsequently estimated, a value corresponding to the estimated offset is added to the positional offset. For example, estimated offset may correspond to the number of pages printed, the operating time, the number of times the device cover was opened and closed, or a value obtained by quantifying these parameters and adding the results.

Note that the value added to an estimated offset is predetermined for each event and each color. For example, the addition and subtraction of force applied by the user when the user opens and closes the cover increases the vibration acting on components in the MFP 100 more than when the MFP 100 is simply printing a single sheet, tending to increase offset. Accordingly, the value added to the estimated offset may be set larger for the opening and closing of the cover than the value added for a single page being printed. If the MFP 100 can sense vibrations, for example, the MFP 100 may add a prescribed value to the estimated offset based on the magnitude of the detected vibrations.

Further, heat sources in the MFP 100, such as a polygon motor (not shown) positioned near the center of the exposure unit 53 and the fixing unit 8, can affect registration in a printing operation. Since the arrangement of the color units 50 in the process unit 5 results in different distances between each color unit 50 and these heat sources, the degree of effect on registration differs for each color. Accordingly, the value added to the estimated offset may be set differently for each color. As a specific example, the polygon motor in the exposure unit 53 is positioned closer to the cyan unit 50C than the black unit 50K. Accordingly, components in the cyan unit 50C tend to have a higher temperature than components in the black unit 50K. Since the thermal expansion of components caused by an increase in temperature can alter the optical path length of the laser light emitted by the exposure unit 53, the value added to the estimated offset for cyan may be set larger than the value added to the estimated offset for black.

The threshold values stored in the look-up table 68 are values predetermined for each color combination and correspond to the estimated offset thought to require execution of the offset acquisition process. Threshold values may differ for each color combination or may be the same. In the MFP 100 of the preferred embodiment, the threshold value is set smaller for the color combination magenta-cyan than for the other color combinations because misregistration between magenta and cyan is more noticeable. Consequently, even if the estimated offsets are approximately the same for each color combination, the condition for executing the offset acquisition process is met more easily with the magenta-cyan combination. In other words, the offset acquisition process is more likely to be executed for misregistration between the magenta and cyan combination than for other color combinations.

Thus, when a command to print a color image is received, the MFP 100 according to the preferred embodiment references the look-up table 68 prior to executing the printing operation. Based on the threshold values stored in the look-up table 68, the MFP 100 sets an execution threshold for each color combination suited to the content of the image being printed. By comparing the set execution thresholds to the estimated offsets stored in the look-up table 68, the MFP 100 determines for each color combination whether or not to execute the offset acquisition process prior to printing the image. Specifically, the MFP 100 determines for each color combination that the execution condition for the offset acquisition process has been met when the estimated offset is greater than the execution threshold value. The execution thresholds will be described later in greater detail.

The MFP 100 executes the offset acquisition process prior to executing the specified printing operation for only those colors in color combinations for which the execution condition for executing the offset acquisition process was met. The MFP 100 also executes the correction value calculation process based on the positional offsets acquired in the offset acquisition process to calculate correction values for correcting this offset. The MFP 100 then uses these correction values to adjust the image-forming positions of the respective color images when performing the printing operation.

On the other hand, the MFP 100 determines that there is little need to execute the offset acquisition process prior to the printing operation for colors not included in color combinations determined to have met the execution condition. That is, since the MFP 100 can predict that the amount of difference between the current offset and the offset found during the previous misregistration correction process is not a high level, accordingly, the MFP 100 executes the printing operation while using the offset correction values calculated and stored in the previous misregistration correction process to adjust the image-forming positions.

Figure 5:
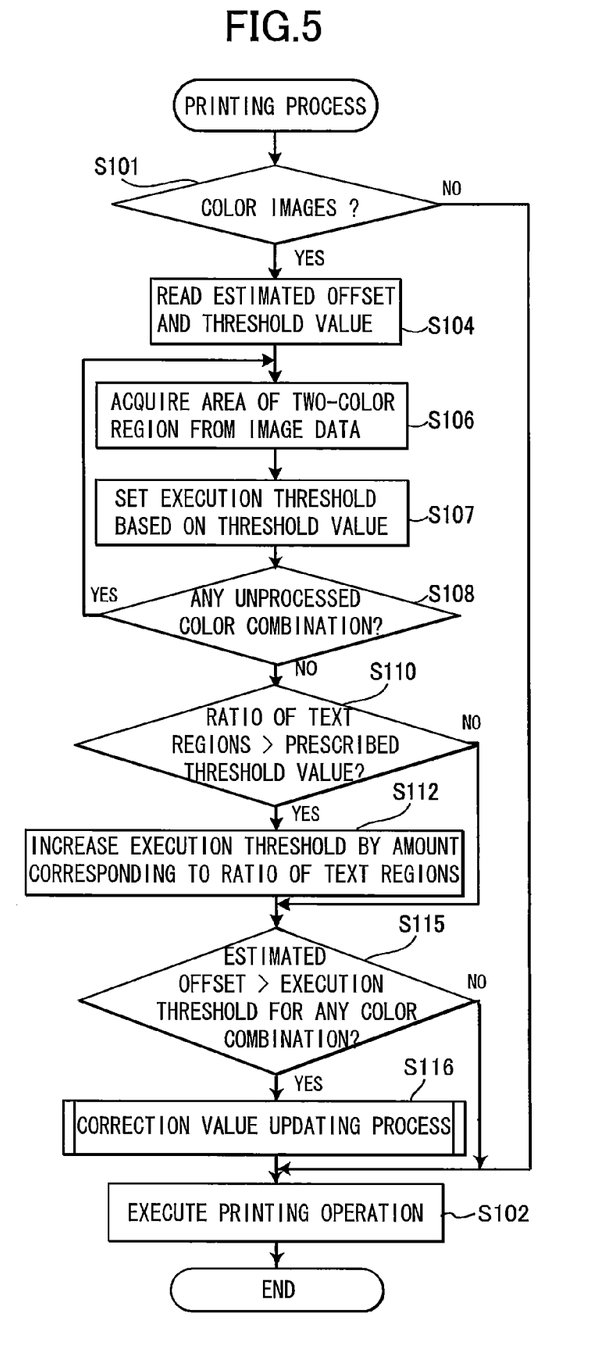
FIG. 5 is a flowchart illustrating steps in a printing process.

Next, steps in a printing process executed by the MFP 100 of the preferred embodiment will be described with reference to the flowchart in FIG. 5. In this printing process, the MFP 100 determines whether the execution conditions have been met for executing an offset acquisition process, adjusts the image-forming positions, and executes the printing operation. The CPU 31 of the MFP 100 executes this printing operation when the MFP 100 receives image data to be printed. The image data to be printed may be data received through the network interface 37 or USB interface 38.

In S101 at the beginning of the printing process, the MFP 100 determines whether the image data received with a print command includes any regions with color images. If the image to be printed includes no color image regions, there is little need to consider color registration. Therefore, the MFP 100 determines that the image data includes no regions with color images (S101: NO) and skips to S102 to execute the printing operation. After completing the printing operation, the MFP 100 ends printing process.

In this specification, a color image will be defined as an image formed by superposing toner images of two or more colors. Thus, the MFP 100 determines in S101 that the image data does not represent a color image if the image is formed of toner in only one color, regardless of the color. Further, the MFP 100 determines in S101 that the image data represents a color image when the image is formed using a plurality of toner colors, even if the image has a uniform tone.

When the MFP 100 determines that the image data includes a color image region (S101: YES), in S104 the MFP 100 references the look-up table 68 stored in the NVRAM 34 and reads the estimated offset and threshold value for each color combination. Since the MFP 100 has a four-color process unit 5, the look-up table 68 includes six color combinations, as shown in FIG. 4. Therefore, the MFP 100 selects each color combination in order and executes the following process for each color combination.

In S106 the MFP 100 acquires the area of the two-color region covered by the current color combination from the image data received with the print command. For example, with the first color combination of yellow and magenta, the MFP 100 calculates the size of the region formed by superposing the yellow and magenta images as the number of pixels in that region.

Note that the calculation in S106 does not take into consideration any regions having images in other colors superposed over the current two-color combination to form a combination of three or more colors because misregistration of any two colors among a three-color combination is less likely to be noticeable. Hence, there is less need to correct misregistration among three-color combinations than misregistration among two-color combinations.

In S107 the MFP 100 sets the execution threshold based on the threshold values read from the look-up table 68 in S104 and the area of the two-color region acquired in S106. Specifically, for smaller areas acquired in S106, the execution threshold is set to larger values in S107. For example, if the area of the image is smaller than a predetermined minimum area, the execution threshold is set to the threshold value read for the current color combination plus a prescribed additional value. The execution threshold may also be set to a fixed multiple of the threshold value. Note that the fixed value, such as the additional value or the fixed multiple, may differ for each color combination. Further, rather than determining an execution threshold based on the area of the image region, the MFP 100 may determine an execution threshold based on the ratio of the image data occupied by the image region.

In short, the execution threshold is a value that reflects the content of the image to be printed. Since misregistration among colors is less likely to be noticeable for color combinations occupying a small area in the image, the condition for executing the offset acquisition process is less likely to be met when the execution threshold is set to a large value. The process in S107 is performed to set an execution threshold based on information related to the size of the superposition region.

On the other hand, if the area of the region configured by the current color combination is not smaller than the minimum area described above, in S107 the MFP 100 sets the execution threshold to a value equivalent to the threshold value acquired from the look-up table 68. Alternatively, when the area of the image region is larger than a predetermined maximum area, the MFP 100 may set the execution threshold to a value smaller than the threshold value. In other words, since even slight offset of a color combination can be noticeable as a whole when the color combination occupies a large area, the condition for executing the offset acquisition process is more likely to be met when the execution threshold is set to a smaller value.

The process in S106 and S107 is repeated for each color combination. That is, in S108 the MFP 100 determines whether there remain any color combinations for which the process in S106 and S107 has not been performed and returns to S106 and selects the next color combination when determining that there remain unprocessed color combinations (S108: YES). In the preferred embodiment, the process in S106 and S107 is executed for a total of six color combinations, with an execution threshold set for each combination.

When the MFP 100 determines in S108 that an execution threshold has been set for each color combination (S108: NO), in S110 the MFP 100 determines whether the ratio of text regions to image regions in the image data is less than a prescribed threshold value. Here, image regions include regions in the image data that are occupied by photos or images, for example, rather than text.

If the MFP 100 determines that the ratio of text regions to image regions is smaller than the prescribed threshold value (S110: YES), in S112 the MFP 100 increases each execution threshold by an amount corresponding to the ratio of text regions to image regions. In other words, a predetermined value is added to all execution thresholds when the ratio of text regions to image regions is less than a predetermined minimum ratio so that the condition for executing the offset acquisition process is less likely to be met because the text regions in which color misregistration is more noticeable occupy a small percentage of the overall image. Alternatively, the execution threshold may be set to a fixed multiple of itself, for example, or the MFP 100 may multiple the execution threshold by a coefficient based on the inverse of the ratio of text regions to image regions, or the like. A text region is an example of the fine line region in the present invention.

Alternatively, in S110 the MFP 100 may acquire the text region ratio for each color combination used in the text regions and may calculate the ratio of text regions to image regions for each color combination. In this case, in S112 the MFP 100 may increase the execution thresholds corresponding only to color combinations used in the text regions. For example, rather than adding a prescribed value to each execution threshold, the MFP 100 may add an additional value determined based on the text region ratio for each color combination. The MFP 100 may also add different values based on the type of color combination. For example, the additional value may be smaller for color combinations in which color misregistration is more noticeable.

However, if the MFP 100 determines in S110 that the ratio of text regions to image regions is not smaller than the prescribed threshold value (S110: NO), then the MFP 100 skips to S115 without changing the execution threshold. In S115 the MFP 100 compares the execution threshold set above with the estimated offset read from the look-up table 68 for each color combination and determines whether the estimated offset is greater than the execution threshold for any color combination.

If the MFP 100 determines that the estimated offset is not greater than the corresponding execution threshold for all color combinations (S115: NO), indicating that the condition for executing the offset acquisition process has not been met, the MFP 100 skips the offset acquisition process and in S102 adjusts the positions of images using the correction values already acquired from the NVRAM 34 and executes the printing operation. Subsequently, the MFP 100 ends the printing process.

However, if the MFP 100 determines that the estimated offset is greater than the corresponding execution threshold for any color combination (S115: YES), in S116 the MFP 100 executes a correction value updating process. The correction value updating process is a process for executing the offset acquisition process to update the correction values. Next, steps in this correction value updating process will be described with reference to the flowchart in FIG. 6.

Figure 6:
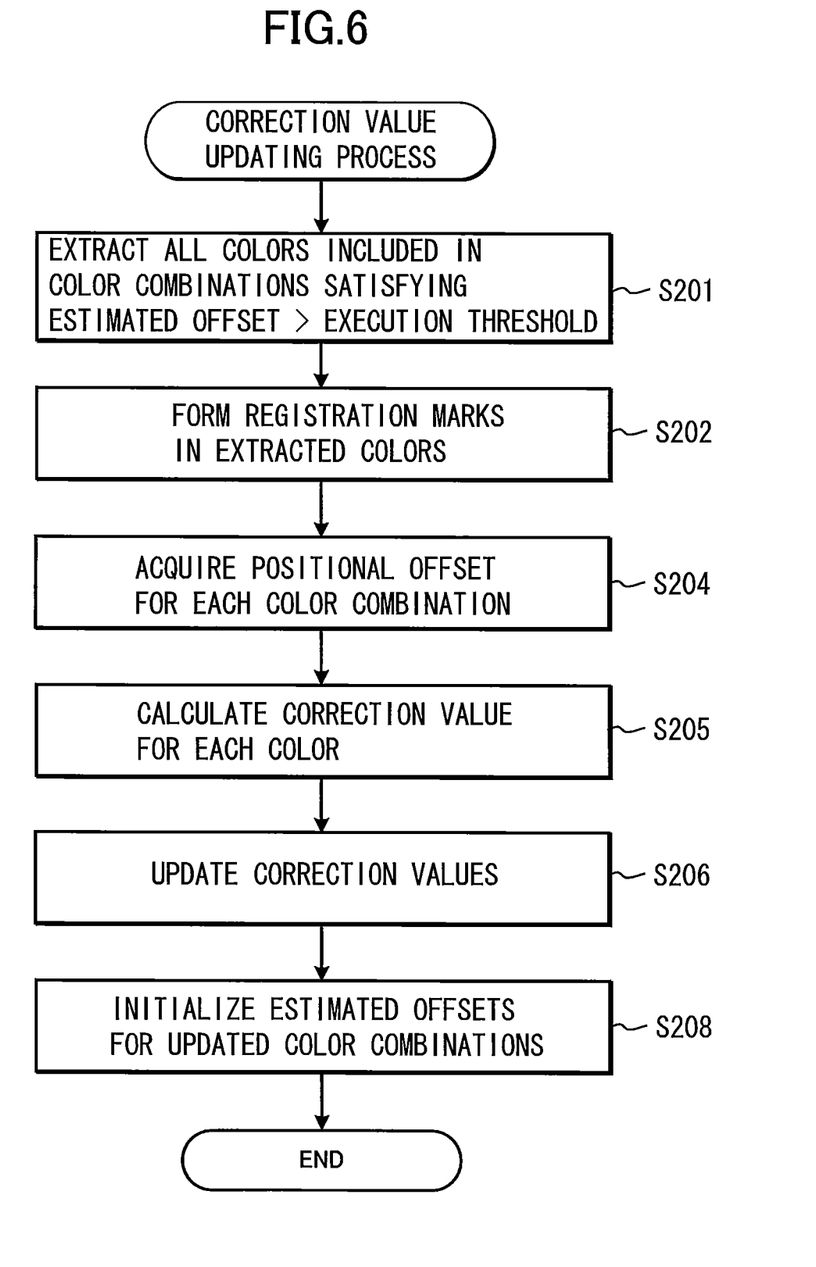
FIG. 6 is a flowchart illustrating steps in a correction value updating process.

In S201 at the beginning of the correction value updating process, the MFP 100 extracts all colors included in color combinations whose estimated offset is greater than the corresponding execution threshold, i.e., the colors in color combinations that satisfy the execution condition for the offset acquisition process. In S202 the MFP 100 forms registration marks 66 with the process unit 5 in the extracted colors.

Next, the MFP 100 controls the marker sensors 61 to emit light from the light-emitting elements 62 onto the conveying belt 7 in the paths of the registration marks 66 formed on the conveying belt 7 and to receive light reflected from the registration marks 66 with the light-receiving elements 63. The MFP 100 acquires the position of each registration mark 66 formed in S202 based on the output signals from the marker sensors 61. In S204 the MFP 100 acquires the positional offset for each color combination based on the acquired positions of the registration marks 66.

In S205 the MFP 100 calculates a correction value for correcting the relevant color misregistration based on the positional offset acquired in S204. Here, the MFP 100 may modify the correction value for one of the colors in the color combination and adjust the position of that color to match the position of the other color, or may adjust both colors in the color combination to approach each other. In S206 the MFP 100 updates the correction values stored in the NVRAM 34 with the above newly calculated correction values.

Note that the MFP 100 may determine in S115 that the estimated offset is greater than the execution threshold for a plurality of color combinations, and in S205 the MFP 100 may calculate correction values for color combinations whose estimated offset is not greater than the corresponding execution threshold based on the registration marks 66 formed in S202. Thus, the MFP 100 may update the correction value for a color combination not among the color combinations whose estimated offset is greater than their execution threshold, provided that positional offset can be acquired for the color combination based on the registration marks 66 formed in S202. In other words, the MFP 100 may calculate and store all correction values that can be calculated based on positional offsets acquired in S204, without forming extra registration marks 66.

After updating the correction value for each color, in S208 the MFP 100 initializes the estimated offsets in the look-up table 68 for the updated color combinations, and subsequently ends the correction value updating process. Note that estimated offsets for color combinations that were not updated are left unchanged.

Returning to FIG. 5, after completing the correction value updating process in S116, in S102 the MFP 100 adjusts the positions for forming images in each color using the correction values stored in the NVRAM 34 and executes a printing operation. Subsequently, the MFP 100 ends the printing process.

As described above, when printing image data having superposition regions in which a plurality of colors are superposed on each other, the MFP 100 of the preferred embodiment references the look-up table 68 and compares the estimated offset for each color combination to the corresponding execution threshold. If the estimated offset exceeds the execution threshold for any color combination, the MFP 100 forms registration marks for at least colors included in these color combinations and detects the positions of registration marks 66 using output signals from the marker sensors 61. The MFP 100 adjusts the image-forming positions for each color based on the detection results for the positions of the registration marks 66. Therefore, the MFP 100 of the preferred embodiment is unlikely to form registration marks when the image data does not include superposed regions and when there are no color combinations whose estimated offset exceeds its execution threshold. For example, the MFP 100 will likely not form registration marks when the ratio of text regions in the overall image data is small or when the color combinations occupy a small area in the image data. In this way, the MFP 100 can be expected to form registration marks suited to the content of the image being printed.

While the invention has been described in detail with reference to specific embodiments thereof, it would be apparent to those skilled in the art that many modifications and variations may be made therein without departing from the spirit of the invention, the scope of which is defined by the attached claims. For example, the present invention is not limited to applications in MFPs, but may be applied to a photocopier, a fax machine, or any device provided with a color-image-forming function. Further, the present invention may be applied to an image forming device employing an inkjet system rather than an electrophotographic system.

In the preferred embodiment, the MFP 100 modifies the condition for executing the offset acquisition process by calculating execution thresholds based on threshold values stored in the look-up table 68, but the MFP 100 may instead modify the estimated offsets in the opposite direction. In the preferred embodiment, for example, the condition for executing the offset acquisition process becomes less likely to be met by increasing the execution thresholds, but the same effect may be achieved by reducing the estimated offsets. That is, in order to modify the likelihood of satisfying the execution condition for the offset acquisition process, the MFP 100 may modify at least one of the estimated offsets and threshold values in order to modify the difference between the two.

In the preferred embodiment, the MFP 100 only forms marks in colors included in color combinations that satisfy the execution condition, but the MFP 100 may execute the offset acquisition process after forming marks in all colors when one or more color combinations meets the execution condition. In this case, the MFP 100 need only be provided with one type of offset acquisition process and one type of correction value calculation process for calculating offset correction values. However, toner consumption can be more reliably reduced by forming marks in only the colors included in color combinations that satisfy the execution condition.

Further, while the process in S106 of the embodiment calculates only areas of regions formed in two-color combinations, the process may also target regions of three or more color combinations. Alternatively, values increased by adding different weights for two-color combination regions and three-color combination regions may be used in place of image area.

Further, while estimated offsets are provided only for two-color combinations in the preferred embodiment, estimated offsets may also be provided for three or more color combinations. In this case, the MFP 100 may also determine whether combinations of three or more colors satisfy the execution condition for the offset acquisition process. In other words, the area of each region in the image data to be printed having three or more superposed colors may be acquired for each color combination. Further, the MFP 100 may ignore combinations of black and another color when the MFP 100 does not superpose black with other colors in text regions. In this case, the bottom three rows in the look-up table 68 of FIG. 4 are unnecessary.

Further, the printing process may include an additional process for cases in which the ratio of text regions to image regions is large. For example, if the MFP 100 determines in S110 that the ratio of text regions to image regions is greater than a predetermined maximum ratio, the MFP 100 may decrease the execution threshold. For example, the MFP 100 may subtract a fixed value from all execution thresholds in this case.

Further, rather than considering text regions in S110, the MFP 100 may consider regions with fine lines, including any region that depicts diagrams, ruled lines, or other fine lines. Further, rather than calculating the ratio of text regions to image regions, the MFP 100 may determine the size of the text regions based on the number of pixels in the regions, for example.

Further, while both the set of steps S106-S108 and the set of steps S110 and S112 are executed in the embodiment described above, it is possible to execute only one of these sets instead.

Further, the registration marks 66 need not be formed on the conveying belt 7, but may be formed in another location at which toner images in each color can be superposed. For example, in an image forming device employing a secondary transfer system, the registration marks 66 are formed on the intermediate transfer belt. In an image forming device employing a 4-cycle system, the registration marks 66 are formed on the photosensitive body.

The processes described in the embodiment may be executed by a single CPU, a plurality of CPUs, hardware such as an ASIC, or a combination of these components. Further, the processes described in the embodiment may be implemented according to various methods and using any of various storage media for storing programs used to execute the processes.

What is claimed is:
1. An image forming device comprising:
a plurality of image-forming units configured to form color image pieces different in color;
a light-emitting element configured to emit light;
a light-receiving element configured to receive light;

a memory configured to store an execution condition for each color combination of two different colors, the execution condition being for correcting misregistration between the two different colors in two image pieces to be superposed one on the other; and a processor configured to:
acquire a reference value set for the color combination of two different colors;
read the execution condition from the memory;
determine whether the reference value meets the execution condition, the determination being performed before forming a finished image including at least a color image portion formed by superposing one of the color image pieces on at least one of remaining color image pieces by using the plurality of image-forming units;
form registration marks for the two different colors in response to determination that the reference value meets the execution condition;
emit light toward a position of each of the registration marks by the light-emitting element;
receive reflected light from the registration marks by the light-receiving element; and
adjust image-forming positions corresponding to the two different colors subject to correction of misregistration based on outputs of the light-receiving element providing detection results of the position of each of the registration marks.

2. The image forming device according to claim 1, wherein the processor is further configured to change criteria for setting the execution condition depending upon information about an area where the two image pieces are superposed.

3. The image forming device according to claim 2, wherein the smaller the area is, the less likely the execution condition is to be met.

4. The image forming device according to claim 2, wherein when the area includes a fine line region where at least one of characters and lines is depicted, the processor is further configured to change the criteria for setting the execution condition depending upon information about an area of the fine line region.

5. The image forming device according to claim 4, wherein the smaller the area of the fine line region is, the more likely the execution condition is to be met.

6. The image forming device according to claim 1, wherein different execution conditions are used depending upon the color combination of two different colors.

7. The image forming device according to claim 6, wherein colors of the image pieces formed by the plurality of image-forming units include at least cyan and magenta, and
wherein the execution condition used for a cyan-magenta combination is set to be more likely to be met than the execution condition used for another two color combinations.

8. The image forming device according to claim 1, wherein the processor is further configured to instruct the plurality of image-forming units to form the registration marks for the two different colors for which the execution condition is met and not to form the registration marks for the two different colors for which the execution condition is not met.

9. The image forming device according to claim 1, further comprising a receiver configured to receive image data,
wherein the processor is further configured to:
acquire an area ratio of fine line regions to image regions in the image data, the fine line region including at least one of characters and lines; and
change criteria for setting the execution condition depending upon the area ratio.

10. The image forming device according to claim 9, wherein the execution condition includes a prescribed threshold value set for the color combination of two different colors,
wherein the processor is further configured to:
determine whether the area ratio is less than the prescribed threshold value;
set an execution threshold by increasing the prescribed threshold value by an amount corresponding to the area ratio in response to determination that the area ratio is less than the prescribed threshold value; and
determine whether the reference value is greater than the execution threshold.

11. The image forming device according to claim 10, wherein the processor is further configured to set the execution threshold by adding a predetermined value to the prescribed threshold value in response to determination that the area ratio is less than the prescribed threshold value.

12. The image forming device according to claim 10, wherein the processor is further configured to set the execution threshold by setting to a fixed multiple of the prescribed threshold value in response to determination that the area ratio is less than the prescribed threshold value.

13. The image forming device according to claim 10, wherein the processor is further configured to set the execution threshold by multiplying the prescribed threshold value by a coefficient based on the inverse of the area ratio.

14. The image forming device according to claim 10, wherein the processor is further configured to set the execution threshold by reducing the prescribed threshold value in response to determination that the area ratio is less than the prescribed threshold value.

15. The image forming device according to claim 14, wherein the processor is further configured to set the execution threshold by reducing the prescribed threshold value by an amount corresponding to the area ratio in response to determine the area ratio is less than the prescribed threshold value.

16. A misregistration adjusting method for an image forming device including a plurality of image-forming units configured to form color image pieces different in color; a light-emitting element configured to emit light; a light-receiving element configured to receive light; and a memory configured to store an execution condition for each color combination of two different colors, the execution condition being for correcting misregistration between the two different colors in two image pieces to be superposed one on the other, the method comprising:
acquiring a reference value set for the color combination of two different colors;
reading the execution condition from the memory;
determining whether the reference value meets the execution condition, the determination being performed before forming a finished image including at least a color image portion formed by superposing one of the color image pieces on at least one of remaining color image pieces by using the plurality of image-forming units;
forming registration marks for the two different colors in response to determination that the reference value meets the execution condition;
emitting light toward a position of each of the registration marks by the light-emitting element;
receiving reflected light from the registration marks by the light-receiving element; and adjusting image-forming positions corresponding to the two different colors subject to correction of misregistration based on outputs of the light-receiving element providing detection results of the position of each of the registration marks.

17. The misregistration adjusting method according to claim 16, further comprising changing criteria for setting the execution condition depending upon information about an area where the two image pieces are superposed,
   wherein the smaller the area is, the less likely the execution condition is to be met.

18. The misregistration adjusting method according to claim 17, wherein when the area includes a fine line region where at least one of characters and lines is depicted, the method further comprises changing the criteria for setting the execution condition depending upon information about an area of the fine line region, and
   wherein the smaller the area of the fine line region is, the more likely the execution condition is to be met.

19. A non-transitory computer readable storage medium storing a set of program instructions executed by a computer, the program instructions comprising:
   acquiring a reference value set for the color combination of two different colors;
   reading the execution condition from a memory;
   determining whether the reference value meets an execution condition, the execution condition being for correcting misregistration between two different colors in two image pieces to be superposed one on the other, the determination being performed before forming a finished image including at least a color image portion formed by superposing one of the color image pieces on at least one of remaining color image pieces by using a plurality of image-forming units;
   forming registration marks for the two different colors in response to determination that the reference value meets the execution condition;
   emitting light toward a position of each of the registration marks by a light-emitting element;
   receiving reflected light from the registration marks by a light-receiving element; and
   adjusting image-forming positions corresponding to the two different colors subject to correction of misregistration based on outputs of the light-receiving element providing detection results of the position of each of the registration marks.

20. The non-transitory computer readable storage medium according to claim 19, wherein the program instructions further comprises changing criteria for setting the execution condition depending upon information about an area where the two image pieces are superposed,
   wherein the smaller the area is, the less likely the execution condition is to be met.

21. The non-transitory computer readable storage medium according to claim 20, wherein when the area includes a fine line region where at least one of characters and lines is depicted, the method further comprises changing the criteria for setting the execution condition depending upon information about an area of the fine line region, and
   wherein the smaller the area of the fine line region is, the more likely the execution condition is to be met.

* * * * *